3,375,247
HETEROCYCLIC COMPOUNDS AND METHODS
FOR THEIR PRODUCTION
Leonard Doub, Bloomfield Hills, and Uldis Krolls, Ann Arbor, Mich., assignors to Parke, Davis & Company, Detroit, Mich., a corporation of Michigan
No Drawing. Filed Aug. 2, 1965, Ser. No. 476,694
6 Claims. (Cl. 260—239.75)

ABSTRACT OF THE DISCLOSURE

N-sulfanilycytosine compounds, substituted in the 1-position by lower alkyl, lower alkoxyalkyl, lower alkenyl, or phenyl-substituted lower alkyl, and alkali metal salts thereof, useful as antibacterial agents, and their production by (a) hydrolysis of a corresponding N-(N-acylsulfanilyl)cytosine, and (b) reduction of a corresponding N-(p-nitrobenzenesulfanilyl)cytosine.

Summary and detailed description

The present invention relates to new cytosine compounds and to methods for their production. More particularly, the invention relates to new N-sulfanilylcytosine compounds, having the formula

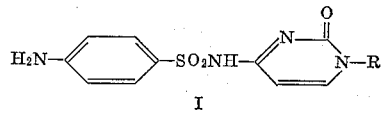

I and to pharmaceutically-acceptable salts thereof; where R is lower alkyl, lower alkoxyalkyl, lower alkenyl, or phenyl-substituted lower alkyl. The lower alkyl, lower alkoxyalkyl, and lower alkenyl groups represented by R are those containing fewer than 7 carbon atoms.

In accordance with the invention, N-sulfanilylcytosine compounds having the foregoing formula are produced by hydrolysis of an acylated N-sulfanilylcytosine compound, having the formula,

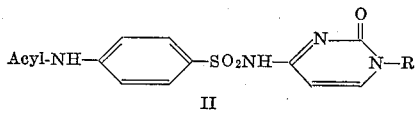

II where acyl is an acyl radical and R has the aforementioned significance. The preferred acyl group is acetyl, although the precise nature of the acyl group is not critical, because during the process this group is removed. Therefore, if desired, the acyl group may contain one or more substituents, such as lower alkyl, lower alkoxy, halogen, nitro, carboxy and carboalkoxy groups, and as used herein the term "acyl" will be understood to include the substituted as well as the unsubstituted radicals. The hydrolysis can be carried out either in an acidic or alkaline medium. An alkaline medium is preferred. The hydrolysis in an alkaline medium can be effected by dissolving the acylated N-sulfanilylcytosine compound of Formula II in an aqueous solution of a base, which is preferably an alkali metal hydroxide, and allowing the hydrolysis to proceed (with or without stirring) until the reaction is complete. The base is normally employed in moderately large excess. While the hydrolysis can be carried out in an aqueous medium alone, it can also be effected in a mixture of water and any of a number of water-miscible, non-reactive solvents, such as lower alkanols, glycols, glycol ethers, dioxane, and terahydrofuran. When the reaction is carried out in an acidic medium, aqueous acetic acid is a useful solvent. The preferred acids for the hydrolysis are the mineral acids. The hydrolysis is favored by temperatures in excess of 75° C., and is preferably effected at a temperature in the range of 90–110° C., or at the reflux temperature of the reaction mixture. The duration of the reaction is not critical and will vary, from about 10–15 minutes to 3 hours and longer, depending on the temperature employed. When the hydrolysis is carried out in an alkaline medium, the N-sulfanilylcytosine product is present in the reaction mixture in the form of a metal salt. The free N-sulfanilylcytosine product, represented by Formula I above, is then obtained by acidification of the mixture. If an acidic hydrolysis medium is employed, the product is present in the form of an acid-addition salt, and the free N-sulfanilylcytosine compound is obtained following neutralization of the reaction mixture by treatment with an aqueous base, such as potassium carbonate.

The acylated N-sulfanilylcytosine compounds having Formula II above that are used as starting materials in the foregoing process can be prepared in a number of ways. In one method, S-methyl-4-thiouracil is reacted with a reagent having the formula

R—X

III and the substituted S-methyl-4-thiouracil intermediate obtained, having the formula,

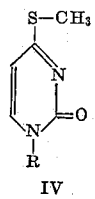

IV is reacted further with an N⁴-acylsulfanilamide compound, having the formula,

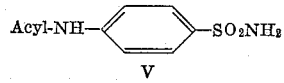

V to give the desired starting material of Formula II; where R and acyl have the aforementioned significance and X is a halogen atom. In another method, a substituted aminopropionitrile compound, having the formula,

R—NH—CH$_2$CH$_2$—CN

VI is reacted with cyanic acid (conveniently generated in situ by reaction of an alkali metal cyanate with a strong acid) to give a substituted 1-(2-cyanoethyl)urea compound, having the formula,

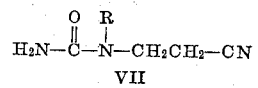

VII this intermediate is reacted with a strong base, such as an alkali metal alkoxide, under anhydrous conditions to give a substituted 5,6-dihydrocytosine compound, having the formula

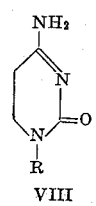

VIII which is converted to an acid-addition salt, such as a hydrohalide salt, by reaction with a strong acid, such as a hydrogen halide, under anhydrous conditions; this dihydrocytosine salt intermediate is dehydrogenated by reaction with bromine at a temperature above 100° C. in a high-boiling unreactive solvent, such as nitrobenzene, and the product mixture neutralized with base to give a substituted cytosine compound, having the formula,

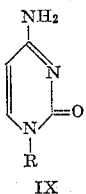

IX which is finally reacted with an acylated sulfanilyl chloride compound, having the formula,

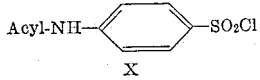

X to give the desired starting material of Formula II. In the foregoing formulas, R and acyl have the same meaning as previously given. The preparation of specific examples of these starting materials and intermediates is described in greater detail hereinafter.

Also in accordance with the invention, N-sulfanilylcytosine compounds having Formula I are produced by the reduction of an N-(p-nitrobenzenesulfonyl)-cytosine compound, having the formula,

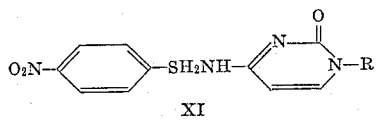

XI where R is as previously defined. The reduction may be accomplished by employing chemical, catalytic, or electrolytic means. The reduction is accomplished catalytically by employing gaseous hydrogen and Raney nickel or a noble metal catalyst, such as platinum, platinum oxide, palladium, or palladium oxide, which may optionally be supported on an inert carrier, such as charcoal. The catalytic reduction is conveniently carried out in an inert solvent at room temperature and a hydrogen pressure of from about 1 to 5 atmospheres. Any of a number of chemical reducing agents may be used, including iron and acetic acid, iron and hydrochloric acid, tin and hydrochloric acid, a stannous halide in a hydrohalic acid, zinc and aqueous sodium hydroxide, zinc and ethanol, aluminum amalgam and ethanol, sodium hydrosulfite, ammonium sulfide and sodium sulfide. A preferred agent is iron and dilute acetic acid. Although additional solvent is not required with most of these reducing agents, it may be advantageous in some cases to employ an unreactive water-miscible solvent, such as a lower alkanol, a glycol, dioxane, or tetrahydrofuran. The temperature and duration of the reduction employing a chemical reducing agent are not critical, and may be varied over a wide range, from 5–10 minutes at an elevated temperature of about 150° C. to 4–5 hours and longer at a temperature of about 40–50° C. When the preferred reducing agent, iron and dilute acetic acid, is employed, the reduction is normally complete after a period of from 30 minutes to 2 hours at a temperature in the range of 75–100° C. When chemical reduction means are employed, it is preferable to use a moderate to large excess of reducing agent, although approximately equivalent amounts of reactants may also be employed. When the reduction is accomplished catalyticallly, the reaction is allowed to proceed until the required amount (3 molecular equivalents) of hydrogen has been taken up.

The N-(p-nitrobenzenesulfonyl)cystosine compounds, having Formula XI above, that are used as starting materials in the foregoing process can be prepared by the reaction of a substituted cytosine compound having Formula IX above with p-nitrobenzenesulfonyl chloride in the presence of a base, such as pyridine. The substituted cytosine compounds of Formula IX can be prepared either as described earlier or by the following series of reactions. α-cyano-β-ethoxy-N-(carbethoxy)-acrylamide is reacted with an amine having the formula,

XII the substituted 5-cyanouracil product, having the formula,

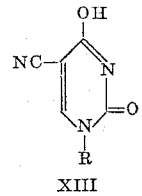

XIII is hydrolyzed and decarboxylated to give a substituted uracil compound, having the formula,

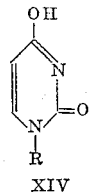

XIV and this intermediate is reacted with phosphorus pentasulfide to give the corresponding substituted thiouracil, which is reacted with liquid ammonia under pressure to give the desired substituted cytosine compound of Formula IX. The preparation of specific examples of these starting materials and intermediates is described in greater detail hereinafter.

The free N-sulfanilylcytosine compounds represented by Formula I form pharmaceutically-acceptable salts by reaction with an alkali metal base, such as sodium hydroxide, potassium hydroxide, or lithium hydroxide. These alkali metal salts may differ somewhat from the free N-sulfanilylcytosine compounds in certain physical properties, such as solubility, but are otherwise equivalent for purposes of the invention.

The compounds of the invention are new chemical compounds that are useful as pharmacological agents. They are antibacterial agents that are active against a number of strains of both gram negative and gram positive organisms, including the following: *P. vulgaris, Staph. aureus,* and *E. coli.* They are active upon either oral or parenteral administration; oral administration is preferred.

The invention is illustrated by the following examples:

*Example 1*

A solution of 65 g. of N-(N-acetylsulfanilyl)-1-ethylcytosine in 380 ml. of 2 N aqueous sodium hydroxide is heated under reflux for 1 hour. Upon cooling, the solution is treated with charcoal, purified by filtration, and acidified with acetic acid. The solid N-sulfanilyl-1-ethylcytosine that precipitates is isolated, washed with water, and dried; M.P. 166.5–168° C. following successive crystallizations from butyl alcohol and from methanol.

The sodium salt is obtained by dissolving 2.9 g. of N-sulfanilyl-1-ethylcytosine together with 0.4 g. of sodium hydroxide in 50 ml. of water at room temperature, evaporating the solution to dryness under reduced pressure at or below room temperature, and isolating and drying the solid salt.

The N-(N-acetylsulfanilyl)-1-ethylcytosine used as a starting material in the foregoing procedure is prepared as follows. To a solution of 333 g. of 3-(ethylamino)propionitrile in 1697.3 ml. of 2 N hydrochloric acid is added 275 g. of potassium cyanate, the resulting solution is concentrated under reduced pressure to a syrup, and the syrup is heated at 90–100° C. for 6 hours and then evaporated to dryness at 90–100° C. under reduced pressure. The residue is extracted with 1600 ml. of hot absolute ethanol, and the extract is concentrated to 500 ml. and chilled. The crystalline 1 - (2 - cyanoethyl)-1-ethylurea obtained is isolated, washed with cold absolute ethanol, and dried: M.P. 88–91° C. This intermediate (58.7 g.) is added to a solution of 11.5 g. of sodium in 500 ml. of methanol and the resulting solution is heated under reflux for 30 minutes. After cooling, the mixture, containing 1-ethyl-5,6-dihydrocytosine, is treated with a slight excess of gaseous hydrogen bromide and evaporated to dryness. The residue is extracted, first with 500 ml., then with 100 ml. of hot isopropyl alcohol, the extracts are combined and chilled, and the crystalline 1-ethyl-5,6-dihydrocytosine hydrobromide obtained is isolated and dried; M.P. 167.5–169.5° C. This salt (88.8 g.) is dissolved in 200 ml. of nitrobenzene at 174° C., 22.6 ml. of bromine is added over a period of 8 minutes, and the mixture is kept at 170–175° C. until hydrogen bromide evolution ceases (about 15 minutes). Upon cooling, there is obtained crude 1-ethylcytosine hydrobromide, which is isolated, washed with ether, and dried; M.P. 170–187° C. This salt is heated at 90–100° C. with 70 ml. of N,N-dimethylformamide and 60 ml. of piperidine, and the resulting solution is chilled to give 1-ethylcytosine; M.P. 238–243° C. A mixture 10.5 g. of 1-ethylcytosine, 18.6 g. of N-acetylsulfanilyl chloride, and 50 ml. of pyridine is stirred at room temperature for 2 days. The precipitated solid is removed by filtration, and the filtrate is evaporated at 60° C. under reduced pressure to a syrup. The syrup is triturated with 0.25 N hydrochloric acid, and the solid N-(N-acetylsulfanilyl)-1-ethylcytosine obtained is isolated and dried. This solid is suitable for use without further purification.

*Example 2*

A mixture consisting of 10 g. of N-(N-acetylsulfanilyl)-1-ethylcytosine and 100 ml. of 1 N hydrochloric acid is heated under reflux for 30 minutes, cooled, and filtered. The filtrate is adjusted to pH 4.2–4.8 by treatment with aqueous potassium carbonate, the aqueous phase is decanted, and the syrupy residue is washed with water, isolated, and dissolved in 200 ml. of hot ethanol. Benzene (50 ml.) is added, and the solution is concentrated to about 50 ml. and cooled in an ice bath. The N-sulfanilyl-1-ethylcytsine that crystallizes (seeding may be required) is isolated, washed with alcohol and with ether, dried, and crystallized from acetonitrile; M.P. 167–168° C.

*Example 3*

A solution of 7.5 g. of N-(N-acetylsulfanilyl)-1-methylcytosine in 47 ml. of 2 N aqueous sodium hydroxide is heated under reflux for 1 hour. The solution is cooled, acidified with acetic acid, and the N-sulfanilyl-4-methylcytosine that precipitates is isolated, washed with water, and dried; M.P. 222–224° C., following successive crystallizations from acetonitrile and from ethanol.

The starting material is obtained as follows. A mixture of 5.76 g. of 1,S-dimethyl-4-thiouracil and 8.56 g. of $N^4$-acetylsulfanilamide is fused in a nitrogetn atmospherer at about 180° C. for 45 minutes. The solid N-(N-acetylsulfanilyl)-1-methylcytosine that is obtained is cooled and purified by crystallization from a 50% aqueous 2-ethoxyethanol solution that is treated with decolorizing charcoal; M.P. 263–269° C.

*Example 4*

A solution of 10.7 g. of N-(N-acetylsulfanilyl)-1-benzylcytosine in 53.8 ml. of 2 N aqueous sodium hydroxide is heated under reflux for 1 hour. The solution is cooled, acidified with a solution of 6 ml. of acetic acid in 30 ml. of water, and the N-sulfanilyl-1-benzylcytosine that precipitates is isolated and crystallized from 50% aqueous 2-ethoxyethanol; M.P. 207–208° C.

The starting material is obtained as follows. To a solution of sodium methoxide prepared from 2.3 g. of sodium methoxide prepared from 2.3 g. of sodium and 200 ml. of methanol is added 14.2 g. of S-methyl-4-thiouracil. The resulting solution is stirred, treated with 18.8 g. of benzyl bromide, heated under reflux for 10 minutes, and then evaporated to dryness. The residue is extracted with chloroform extract is diluted with several volumes of ether and chilled, and the precipitated 1-benzyl-S-methyl-4-thiouracil is isolated, washed with ether, and crystallized from acetonitrile; M.P. 151–152° C. A mixture of 9.0 g. of 1-benzyl-S-methyl-4-thiouracil and 8.3 g. of $N^4$-acetylsulfanilamide is fused at 200° C. for about 1 hour or until gas evolution ceases. The mixture is cooled and slurried with ethanol and the crystalline N-(N-acetylsulfanilyl)-1-benzylcytosine obtained is isolated and dried; M.P. 237–241° C.

*Example 5*

A solution of 7.6 g. of N-(N-acetylsulfanilyl)-1-(2-ethoxyethyl)cytosine in 400 ml. of 2 N aqueous sodium hydroxide is heated under reflux for 1 hour, cooled, filtered, and acidified with 5 ml. of glacial acetic acid. The N-sulfanilyl-1-(2-ethoxyethyl)cytosine that precipitates is isolated and crystallized from acetonitrile; M.P. 175–179.5° C., after preliminary melting and resolidification at 155–158° C.

The starting material is obtained as follows. To a solution of sodium ethoxide prepared from 2.3 g. of sodium and 400 ml. of ethanol is added 14.2 g. of S-methyl-4-thiouracil, and the mixture is stirred, treated with 16.8 g. of 2-ethoxyethyl bromide, and heated under reflux for 16 hours. After filtration, the solution is evaporated to dryness under reduced pressure, and the residue is extracted several times with chloroform. The combined chloroform extract is evaporated, and the syrup obtained crystallizes on standing to give 1-(2-ethoxyethyl)-S-methyl-4-thiouracil; M.P. 102–105° C., following crystallization from ethanol. A mixture of 11.17 g. of 1-(2-ethoxyethyl)-S-methyl-4-thiouracil and 11.15 g. of $N^4$-acetylsulfanilamide is fused in a nitrogen atmosphere at 200° C. until gas evolution ceases. The mixture is cooled, dissolved in 70 ml. of hot ethanol, and an equal volume of hot water is added to the solution. Upon cooling, there is obtained a precipitate of N-(N-acetylsulfanilyl)-1-(2-ethoxyethyl)cytosine, which is isolated, washed with water, and dried; M.P. 129–131.5° C.

*Example 6*

A mixture consisting of 155 g. of reduced iron, 1.0 ml. of glacial acetic acid, and 1000 ml. of water is stirred and heated under reflux for one hour. N-(p-nitrobenzenesulfonyl)-1-ethylcytosine (40 g.) is added, the mixture is stirred and heated under reflux for one hour more, cooled, and 1500 ml. of ethanol is added and the mixture stirred and heated under reflux for an additional hour. Upon cooling, the mixture is treated with 200 ml. of concentrated ammonium hydroxide, cooled in ice and filtered. The filtrate is concentrated to half-volume and acidified with 10 ml. of glacial acetic acid. The N-sulfanilyl-1-ethylcytosine that precipitates is isolated, washed with water, and dried; M.P. 165.5–166.5° C., following crystallization from 1-butanol.

The potassium salt is obtained by dissolving 2.9 g. of N-sulfanilyl-1-ethylcytosine together with 0.56 of potassium hydroxide in 50 ml. of water at room temperature, evaporating the solution to dryness under reduced pressure at or below room temperature, and isolating and drying the solid salt.

The N-(p-nitrobenzenesulfonyl)-1-ethylcytosine used as starting material in the foregoing procedure is prepared as follows. A mixture consisting of 4.65 g. of p-nitrobenzenesulfonyl chloride, 2.78 g. of 1-ethylcytosine, and 232 ml. of pyridine is stirred and heated at 60° C. for 9 hours, and then evaporated under reduced pressure to a viscous syrup. The syrup is triturated with an ice-water mixture until it solidifies, and the solid obtained is isolated, washed with water and extracted with warm 5% aqueous ammonia. The basic extract is treated with charcoal and filtered, and the filtrate is acidified with dilute hydrochloric acid. The N-(p-nitrobenzenesulfonyl)-1-ethylcytosine that precipitates is isolated, washed with water and dried; M.P. 188° C. following crystallization from acetonitrile.

*Example 7*

A mixture consisting of 41.5 g. of reduced iron, 1.0 ml. of glacial acetic acid, and 500 ml. of water is stirred and heated under reflux for one hour. N - (p - nitrobenzenesulfonyl)-1-isobutylcytosine (11.62 g.) is carefully added, the mixture is stirred and heated under reflux for an additional hour, cooled, and 360 ml. of ethanol is added and the mixture stirred and heated under reflux for one hour more. Upon cooling, the mixture is treated with 40 ml. of concentrated aqueous ammonia, cooled in ice and filtered. The filtrate is concentrated to a volume of about 260 ml., a small amount of aqueous ammonia is added, and the solution is filtered and acidified with acetic acid. The N-sulfanilyl-1-isobutylcytosine that precipitates is isolated, dried, and crystallized from acetonitrile; M.P. 132.5–135° C.

By utilizing the foregoing procedure, the following N-sulfanilyl-1-(lower alkyl)cytosine compounds are obtained by the reduction of the designated N-(p-nitrobenzenesulfonyl)-1-(lower alkyl)cytosine compounds:

(a) From the reduction of N-(p-nitrobenzenesulfonyl)-1-sec-butylcytosine there is obtained N-sulfanilyl-1-sec-butylcytosine; M.P. 136–138° C., following crystallization from methanol.

(b) From the reduction of N-(p-nitrobenzenesulfonyl)-1-n-butylcytosine there is obtained N-sulfanilyl-1-n-butylcytosine; M.P. 118–120° C., following crystallization from ethanol.

(c) From the reduction of N-(p-nitrobenzenesulfonyl)-1-isopropylcytosine there is obtained N-sulfanilyl-1-isopropylcytosine; M.P. 201–203° C., following crystallization from absolute ethanol.

(d) From the reduction of N-(p-nitrobenzenesulfonyl)-1-n-propylcytosine there is obtained N-sulfanilyl-1-n-propylcytosine; M.P. 141–142° C., following crystallization from acetonitrile.

The preparation of the various N-(p-nitrobenzenesulfonyl)-1-(lower alkyl)cytosine compounds used above as starting materials can be illustrated by the preparation of N - (p-nitrobenzenesulfonyl)-1-isobutylcytosine according to the following procedure.

A mixture consisting of 290 g. of 5-cyano-1-isobutyluracil, 924 ml. of water, 924 ml. of glacial acetic acid, and 924 ml. of concentrated hydrochloric acid is heated under reflux for 50 hours and then evaporated under reduced pressure to a volume of about 300 ml. The residue, which solidifies on standing, is extracted with warm water to remove ammonium chloride, and is isolated and crystallized successively from water, after treatment of the aqueous solution with charcoal, and from ethyl acetate to give 1-isobutyluracil; M.P. 94–95° C. A mixture consisting of 121.7 g. of 1-isobutyluracil, 64.2 g. of phosphorus pentasulfide, and 1500 ml. of pyridine is stirred and heated under reflux for 4 hours. The supernatant solution is separated by decantation, evaporated to dryness under reduced pressure, and the syrupy residue is dissolved in 600 ml. of warm 5% aqueous ammonia. The basic solution is purified by treatment with charcoal and is acidified to pH 2–3 with hydrochloric acid. The acidified mixture is kept at room temperature overnight and the 1-isobutyl-4-thiouracil that precipitates is isolated and crystallized from ethanol; M.P. 91–93° C. A mixture consisting of 33 g. of 1-isobutyl-4-thiouracil, 300 ml. of liquid ammonia, and 1200 liters of methanol is heated in a pressure vessel at 120° C. for 24 hours. Upon cooling, there is obtained a crude precipitate of 1-isobutylcytosine, which is isolated by filtration. The filtrate is concentrated and chilled to give additional solid 1-isobutylcytosine. The crude solids are combined and dissolved in dilute hydrochloric acid. The acidic solution is purified with charcoal and made alkaline to precipitate purified 1-isobutylcytosine; M.P. 256–257° C., following crystallization from acetonitrile. To a stirred mixture of 16 g. of 1-isobutylcytosine in 1000 ml. of pyridine at 55° C. is added in portions 22.2 g. of p-nitrobenzenesulfonyl chloride. The resulting mixture is heated at 65° C. for 3 hours and at 45° C. for 16 hours, and is evaporated to dryness under reduced pressure. The residue is stirred with hot water, and the solid that forms is isolated and dissolved in 480 ml. of warm 5% aqueous ammonia. The basic solution is filtered and acidified with hydrochloric acid. The N-(p-nitrobenzenesulfonyl)-1-isobutylcytosine that precipitates is isolated, washed with water, and dried; M.P. 175–178° C.

The following N - (p - nitrobenzenesulfonyl) - 1 - (lower alkyl)cytosine compounds are prepared in a similar manner starting in each case from a 5-cyano-1-(lower alkyl) uracil compound:

(a) N-(p-nitrobenzenesulfonyl) - 1 - secbutylcytosine, M.P. 197–199° C., is obtained starting from 5-cyano-1-sec-butyluracil by way of 1-sec-butyluracil, M.P. 108–113° C. (crystallized from ethyl acetate); 1-sec-butyl-4-thiouracil, M.P. 96–97° C. (ethanol); and 1-sec-butylcytosine, M.P. 217–220° C. (acetonitrile).

(b) N-(p-nitrobenzenesulfonyl) - 1 - n-butyl-cytosine, M.P. 152–154° C., is obtained starting from 1-n-butyl-5-cyanouracil by way of 1-n-butyluracil, M.P. 102–103.5° C. (water); 1-n-butyl-4-thiouracil, M.P. 68–70° C. (isopropyl alcohol); and 1-n-butylcytosine, M.P. 228.5–230.5° C. (ethanol).

(c) N-(p-nitrobenzenesulfonyl) - 1 - isopropylcytosine, M.P. 200.5–203° C., is obtained starting from 5-cyano-1-isopropyluracil by way of 1-isopropyluracil, M.P. 131–133° C. (water); 1 - isopropyl-4-thiouracil, M.P. 147–149° C. (ethanol); and 1-isopropylcytosine, M.P. 201–102.5° C. (ethanol).

(d) N-(p-nitrobenzenesulfonyl) - 1 - n-propylcytosine, M.P. 154.5–155° C., is obtained starting from 5-cyano-1-n-propyluracil by way of 1-n-propyluracil, M.P. 119.5–121° C. (water); 1-n-propyl-4-thiouracil, M.P. 88.5–89.5° C. (isopropyl alcohol); and 1 - n - propylcytosine, M.P. 256–258° C. (ethanol).

*Example 8*

A mixture consisting of 41.5 g. of reduced iron, 1.0 ml. of glacial acetic acid, and 500 ml. of water is stirred and heated under reflux for one hour. N-(p-nitrobenzenesulfonyl) - 1 - allylcytosine (12.8 g.) is added, the mixture is stirred and heated under reflux for an additional hour, cooled, and 360 ml. of ethanol is added and the mixture stirred and heated under reflux for one hour more. Upon cooling, the mixture is treated with 40 ml. of concentrated aqueous ammonia, cooled in ice and filtered. The filtrate is concentrated to a volume of about 250 ml., a small amount of aqueous ammonia is added, and the solution is filtered and acidified with acetic acid. The N-sulfanilyl-1-allylcytosine that precipitates is isolated, dried, and crystallized from acetonitrile; M.P. 165–167° C.

The lithium salt is obtained by dissolving 6.12 g. of N-sulfanilyl-1-allylcytosine together with 0.48 g. of lithium hydroxide in 50 ml. of water at room temperature, evaporating the solution to dryness under reduced pressure at or below room temperature, and isolating and drying the solid salt.

The N-(p-nitrobenzenesulfonyl) - 1 - allylcytosine used as a starting material in the foregoing procedure is prepared as follows. To a solution of 477 g. of α-cyano-β-ethoxy-N-(carbethoxy)acrylamide in 1000 ml. of absolute ethanol heated to reflux is slowly added 279 g. (367 ml.) of allylamine, and the resulting mixture is heated under reflux for 30 minutes. The cooled solution is acidified by the addition of 230 ml. of concentrated hydrochloric acid, and the acidified mixture is chilled to precipitate crystalline 1-allyl-5-cyanouracil, which is isolated by filtration and dried; M.P. 149–152° C. A mixture consisting of 306.9 g. of 1-allyl-5-cyanouracil, 924 ml. of water, 924 ml. of glacial acetic acid, and 924 ml. of concentrated hydrochloric acid is heated under reflux for 50 hours and then evaporated under reduced pressure to a volume of about 300 ml. The residue, which solidifies on standing, is extracted with warm water to remove ammonium chloride, and is isolated and crystallized from water to give 1-allyluracil; M.P. 105–108° C. A mixture consisting of 65 g. of 1-allyluracil, 28.5 g. of phosphorus pentasulfide, and 1100 ml. of pyridine is stirred and heated under reflux for 4 hours. The supernatant solution is separated by decantation, evaporated to dryness under reduced pressure, and the syrupy residue is dissolved in 600 ml. of warm 5% aqueous ammonia. The basic solution is purified by treatment with charcoal and is acidified to pH 2–3 with hydrochloric acid. The acidified mixture is kept at room temperature overnight and the 1-allyl-4-thiouracil that precipitates is isolated and crystallized from acetone; M.P. 122–125° C. This intermediate (30 g.) is converted to 1-allylcytosine, M.P. 235–237° C., by reaction with 200 ml. of liquid ammonia in 1000 ml. of methanol, and the 1-allylcytosine (13.6 g.) is reacted with p-nitrobenzenesulfonyl chloride (20 g.) in 700 ml. of pyridine to give the desired N-(p-nitrobenzenesulfonyl)-1-allylcytosine, M.P. 162–166° C., according to the procedure described in Example 6 above for the preparation of N-(p-nitrobenzenesulfonyl)-1-isobutyl cytosine.

*Example 9*

A mixture consisting of 15.9 g. of N-(p-nitrobenzenesulfonyl)-1-ethylcytosine, 2.0 g. of Raney nickel, and 350 ml. of dioxane is shaken at room temperature with hydrogen at an initial pressure of 54 lbs./in.² for 5–6 hours or until no more hydrogen is absorbed. The catalyst is removed by filtration, and the filtrate is evaporated to dryness under reduced pressure. The solid N-sulfanilyl-1-ethylcytosine thus obtained is crystallized successively from methanol and from acetonitrile; M.P. 166–168° C.

What is claimed is:

1. A member of the class consisting of N-sulfanilylcytosine compounds, having the formula,

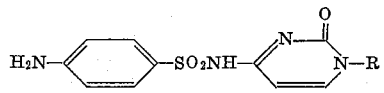

and pharmaceutically-acceptable alkali metal salts thereof; where R is a member of the class consisting of lower alkyl, lower alkoxyalkyl, lower alkenyl, and phenyl-substituted lower alkyl.

2. N-sulfanilyl-1-ethylcytosine.
3. N-sulfanilyl-1-methylcytosine.
4. N-sulfanilyl-1-isopropylcytosine.
5. N-sulfanilyl-1-n-propylcytosine.
6. N-sulfanilyl-1-(2-ethoxyethyl)cytosine.

References Cited

UNITED STATES PATENTS 3,249,603  5/1966  Bretschneider et al. _ 260—239.75

FOREIGN PATENTS

Houben-Weyl, Methoden der Organischen Chemie, vol. 11/1, pp. 394–406 (1957).

NORMA S. MILESTONE, *Acting Primary Examiner.*

WALTER A. MODANCE, *Examiner.*

H. MOATZ, *Assistant Examiner.*

UNITED STATES PATENT OFFICE
CERTIFICATE OF CORRECTION

Patent No. 3,375,247          Dated March 26, 1968

Inventor(s) LEONARD DOUB AND ULDIS KROLLS

It is certified that error appears in the above-identified patent and that said Letters Patent are hereby corrected as shown below:

In place of Formula XI, line 30 of Column 3, insert the following formula:

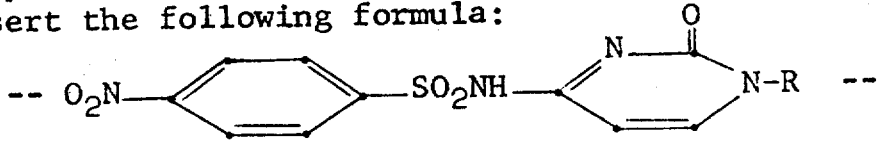

XI

Signed and sealed this 17th day of September 1974.

(SEAL)
Attest:

McCOY M. GIBSON JR.          C. MARSHALL DANN
Attesting Officer            Commissioner of Patents